United States Patent
Miyawaki et al.

(10) Patent No.: US 7,706,024 B2
(45) Date of Patent: Apr. 27, 2010

(54) IMAGE PROCESSING APPARATUS

(75) Inventors: Mai Miyawaki, Fukuchiyama (JP); Yusuke Iida, Ayabe (JP)

(73) Assignee: Omron Corporation, Kyoto-Shi (JP)

( * ) Notice: Subject to any disclaimer, the term of this patent is extended or adjusted under 35 U.S.C. 154(b) by 784 days.

(21) Appl. No.: 11/528,689

(22) Filed: Sep. 28, 2006

(65) Prior Publication Data

US 2007/0076277 A1    Apr. 5, 2007

(30) Foreign Application Priority Data

Sep. 30, 2005    (JP) .............................. 2005-287476

(51) Int. Cl.
  *H04N 1/40* (2006.01)
  *G03F 3/08* (2006.01)
(52) U.S. Cl. ...................... 358/3.24; 358/518; 382/167
(58) Field of Classification Search ................ 358/520, 358/522, 1.9, 3.06, 3.21, 3.24, 3.26, 500, 358/504, 518, 523; 382/168, 162, 167, 172
See application file for complete search history.

(56) References Cited

U.S. PATENT DOCUMENTS 5,799,105 A * 8/1998 Tao ............................ 382/167
6,711,289 B1 * 3/2004 Sakamoto ................... 382/167
6,842,536 B2 * 1/2005 Aihara ........................ 382/167
7,016,075 B1 * 3/2006 Tsukada ...................... 358/1.9

FOREIGN PATENT DOCUMENTS

JP       02-194479       8/1990

OTHER PUBLICATIONS

Amoroso et al., "A New Technique for Color Image Segmentation," IEEE Xplore, Apr. 1, 2009, 7 Sheets.

* cited by examiner

*Primary Examiner*—James A Thompson
(74) *Attorney, Agent, or Firm*—Foley & Lardner LLP

(57) ABSTRACT

An image processing apparatus that can determine an optimal registration color according to an acquired image is provided. An image processing unit 6 receives a sample image from an imaging unit 2 and acquires a hue with respect to each of pixels arranged two-dimensionally that constitute the sample image and calculates a hue histogram. A control unit 4 extracts a candidate color based on the hue at a maximum point in the hue histogram received from the image processing unit 6. At the same time, the control unit 4 determines a hue threshold value in order to define the range of the color regarded as the candidate color. Furthermore, the control unit 4 extracts all pixels that satisfy the hue threshold value of the candidate color and acquires the value and chroma of the extracted pixel and sets the maximum value and the minimum value in the acquired value and chroma to a value threshold value and a chroma threshold value. The control unit 4 stores the determined hue threshold value, value threshold value and chroma threshold value in a memory unit 6a.

10 Claims, 7 Drawing Sheets

IMAGE PROCESSING APPARATUS

BACKGROUND OF THE INVENTION

This application claims priority from Japanese patent application 2005-287476, filed on Sep. 30, 2005. The entire content of the aforementioned application is incorporated herein by reference.

1. Field of the Invention

The present invention relates to an image processing apparatus that specifies a region having a previously registered color in an acquired image and more particularly, to an image processing apparatus that can easily extract a candidate color for a registration color from a model image.

2. Description of the Background Art

Automatization has been increased in a manufacturing field in view of laborsaving and promotion of high efficiency. In order to implement automatization, many sensors using light, electricity, electric wave, acoustic wave and the like are used. Among such sensors, an image sensor that can determine whether a product is defective or not or identify the product by taking the image of the product and processing the image is often used. According to the image sensor, since a detecting function similar to visual detection by a human can be implemented, its applied field is wide.

The image sensor comprises an imaging unit for taking the image of an object to be detected, and an image processing unit (referred to as an amplifying unit also) for processing the image taken from the imaging unit in general, in which it is determined whether a region having a predetermined configuration is contained in the image taken by the imaging unit or not.

According to a general-purpose image sensor especially, it is generally constituted such that the configuration of the object to be detected is determined based on a gray image that does not contain color information. However, as an information technology has been progressed recently, even in a general-purpose image sensor, the image sensor that can determine a color using an color image at the same time in addition to conventional determination of the configuration has been used in practice. Such determination of the color includes a process for specifying a region having a predetermined registered color in the acquired image.

According to the conventional configuration detection using the gray image, the configuration is determined based on a so-called gray image consisting of a plurality of pixels each having one-dimensional gradation value (256 gradation, for example). Meanwhile, each pixel constituting a color image is expressed by three-dimensional coordinates comprising a RGB value comprising respective proportions of red, green and blue based on three primary colors of light, or comprising values of a hue, value and chroma that are three attributes of color. Therefore, in order to set the registration color to specify the region, three parameters are needed. In addition, such parameter is called a color parameter also.

Therefore, an image processing apparatus that acquires a model image to extract the registration color and displays a color contained in the model image has been devised.

For example, Japanese Patent Application Laid-Open No. 2-194479 (patent document 1) discloses an image processing apparatus that can automatically extract a color parameter at a designated point (pixel).

Meanwhile, even in an image that appears in the same color from human eyes, a color parameter of each pixel is slightly different in many cases. This means that the image processing apparatus determines that the region consists of a plurality of different colors.

Thus, according to a general image processing apparatus that processes a color image, a process in which a threshold value width is given to a color parameter for the registration color and the pixel having the color contained within the range of the threshold value width is regarded as the registration color is performed. Conversely, the region cannot be specified for practical use unless an optimal color parameter range is set according to the degree of dispersion of the color parameter in the whole image.

However, according to the conventional image processing apparatus, although the color parameter at a specific point (pixel) can be acquired, an optimal color parameter range cannot be acquired from the obtained whole image. Therefore, it is necessary to determine the registration color through a trial and error process, according to various shooting condition such as lighting and reflection coefficient, so that the image processing apparatus cannot be satisfactorily operated without dependence on the intuition or experience of the person of skill in many cases.

SUMMARY OF THE INVENTION

Thus, the present invention was made in order to solve the above problems and it is an object of the present invention to provide an image processing apparatus that can determine an optimal registration color according to an acquired image.

An image processing apparatus according to the present invention specifies a region having a registration color that is registered from a color contained in a predetermined color range in an acquired image and comprises a hue acquiring device that receives a model image to set the registration color and acquires a hue with respect to each of pixels constituting the model image, a hue histogram calculating device that calculates a hue histogram with respect to the pixels constituting the model image, based on the hue acquired by the hue acquiring device, and a candidate color extracting device that extracts a candidate color in the predetermined color range nominated for the registration color, among the colors contained in the model image, based on the hue histogram calculated by the hue histogram calculating device.

Preferably, the candidate color extracting device extracts the color having the hue at a maximum point in the hue histogram or the color containing the hue within the predetermined range.

Preferably, the candidate color extracting device includes a hue threshold value determining device that determines a hue threshold value to define a predetermined range with respect to each candidate color, based on the hue histogram so that each of the candidate colors contains the color within the predetermined range.

Preferably, the hue threshold value determining device determines the hue threshold value so that the hue within the predetermined range from hue at the maximum point in the hue histogram is contained in the candidate color.

Preferably, when a minimum point in the histogram is contained in the predetermined range from the hue at the maximum point in the hue histogram, the hue threshold value determining device determines the hue threshold value at the minimum value as the hue threshold value.

Preferably, the image processing apparatus further comprises a display device, in which the hue threshold value determining device receives a command for changing the hue threshold value from the outside and updates the hue threshold value, and the display device displays the hue histogram calculated by the hue histogram calculating device and the hue threshold value.

Preferably, the candidate color extracting device further includes a value and chroma threshold value determining device for determining a value threshold value and a chroma threshold value for defining the range of the color regarded as the candidate color, based on the value and chroma of the pixel that satisfies the hue threshold value determined by the hue threshold value determining device among pixels constituting the model image.

Preferably, the value and chroma threshold value determining device receives a command for changing the value threshold value and/or the chroma threshold value from the outside and updates the value threshold value and/or the chroma threshold value.

Preferably, the hue acquiring device receives a region setting command to set a region for extracting the candidate color in the model image from the outside, and acquires the hue with respect to the pixel contained in the region set according to the region setting command.

Preferably, the image processing apparatus further comprises a region specifying device that receives a command for selecting the candidate color to be the registration color form the outside and specifies the region having the candidate color selected by the selecting command in the acquired image and displays it.

Preferably, when the plurality of candidate colors are selected by the selecting command, the region specifying device specifies a region for each of the plurality of candidate colors and displays the specified regions superposed to each other.

According to the present invention, a hue close to the reference of visual color identification is acquired with respect to each pixel constituting a model image and a hue histogram is calculated with respect to the whole model image. Then, based on the calculated hue histogram, a candidate color to be nominated for the registration color is extracted from the colors contained in the model image. Thus, since the suitable candidate color can be extracted as a whole of the model image, the image processing apparatus can determine an optimal registration color according to an acquired image.

DESCRIPTION OF THE PREFERRED EMBODIMENTS

Figure 1:
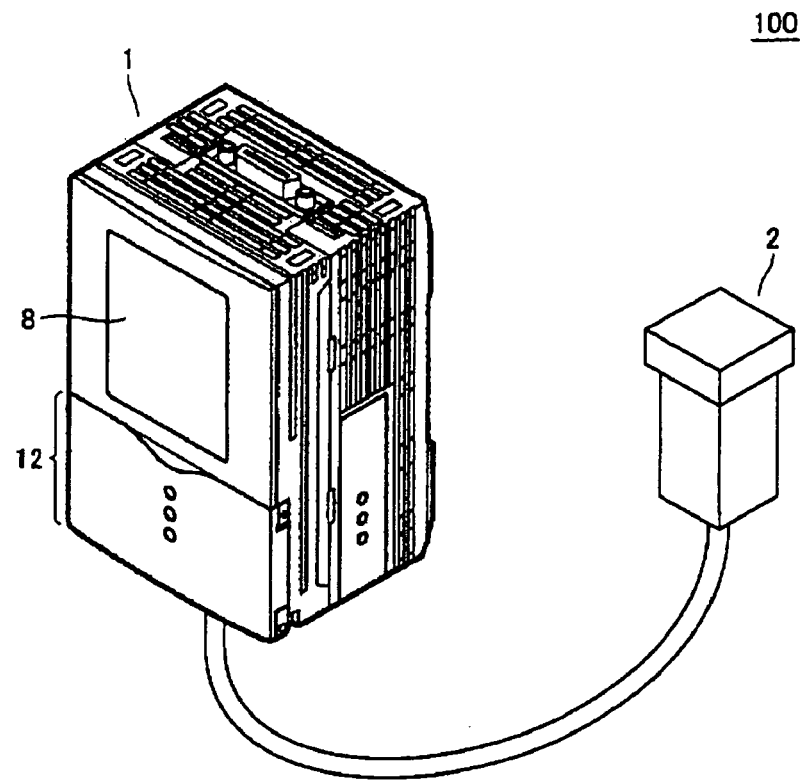
FIG. 1 shows an external view of an image sensor comprising an image processing apparatus according to an embodiment of the present invention.

Embodiments of the present invention will be described with reference to the drawings hereinafter. In addition, the safe reference numerals are allotted to the same or corresponding parts in the drawing the description thereof will not be repeated.

FIG. 1 shows an external view of an image sensor 100 comprising an image processing apparatus 1 according to this embodiment of the present invention.

Referring to FIG. 1, the image sensor 100 is arranged in a manufacturing line, takes the image of a product sequentially transported, specifies a region having a registration color or a color regarded as the registration color from the image, and determines whether the product is defective or not, for example. In addition, the image sensor 100 may output the determined result to another apparatus (not shown). The image sensor 100 comprises an imaging unit 2 and the image processing apparatus 1, in which the imaging unit 2 takes the image of an object to be detected and the image processing apparatus 1 processes the image.

The imaging unit 2 is connected to the image processing apparatus 1 through a cable and arranged at a position suitable for taking the image of the object.

The image processing apparatus 1 comprises a display and an input unit 12 covered with a slide cover on its one surface. The image processing apparatus 1 displays the image taken by the imaging unit 2 or the image processed by itself on the display 8 for a user and receives a command from the user through the input unit 12.

Figure 2:
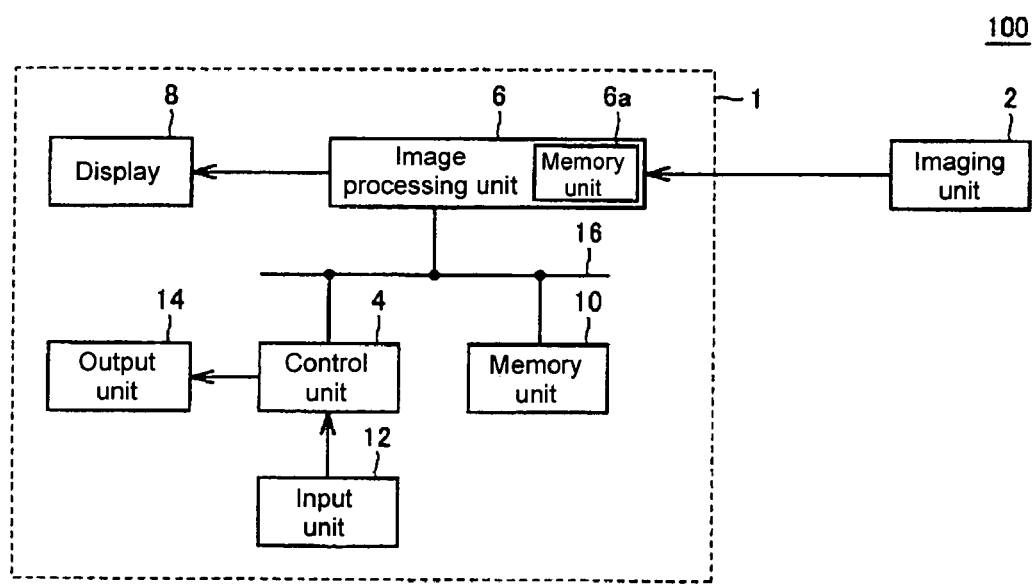
FIG. 2 shows a schematic block diagram of the image sensor.

FIG. 2 shows a schematic block diagram of the image sensor 100. Referring to FIG. 2, the image processing apparatus 1 connected to the imaging unit 2 comprises the display 8, the input unit 12, an output unit 14, a control unit 4, an image processing unit 6, and a memory unit 10.

The imaging unit 2 comprises an imaging element such as a CCD (Coupled Charged Device) or a CMOS (Complementary Metal Oxide Semiconductor) sensor and a lens, for example and takes the image of an object to be detected and outputs the image to the image processing apparatus 1. In addition, the image taken by the imaging unit 2 may be a static image or a moving image.

The display 8 receives the image taken by the imaging unit 2 from the image processing unit 6 or the image processed by the image processing unit 6 and displays it for the user. For example, the display 8 comprises a LCD (Liquid Crystal Display), an EL display (Electro Luminescence Display) or the like.

The input unit 12 receives a command for setting, a command for changing, a command for determination and the like from the user and outputs it to the control unit 4. As will be describe below, the user gives each command by operating keys arranged on the surface of the image processing apparatus 1, for example.

In addition, since the display 8 and the input unit 12 connects the image sensor 100 to the user, it is called a HMI (Human Machine Interface) collectively.

The output unit 14 outputs a result processed by the control unit 4 to the outside. For example, the output unit 14 comprises a contact output (DO) comprising a photo diode, a transistor or a relay, or communicating device such as USB (Universal Serial Bus), RS-232C (Recommended Standard 232 version C), IEEE (Institute of Electrical and Electronic Engineers) 1394, SCSI (Small Computer System Interface) and Ethernet (registered brand).

The image processing unit 6, the control unit 4 and the memory unit 10 are connected to each other through a bus 16 to receive or output data.

The control unit 4 operates in a "teaching mode" or a "detecting mode" according to the command from the input unit 12. In the "teaching mode", the control unit 4 recognizes the image that the image processing unit 6 acquires from the imaging unit 2 as a model image and extracts a registration color to be nominated as the registration color together with the image processing unit 6. In addition, in the "detecting mode", the control unit 4 recognizes the image that the imaging unit 2 acquires from the image processing unit 6 as an inputted image of the object to be detected and specifies the region having the registration color together with the image processing unit 6.

The memory unit 10 is a non-volatile memory medium and stores a program to be executed by the control unit 4 or a set value applied from the user. For example, the memory unit 10 comprises a semiconductor memory or a hard disk drive (HDD) or may comprise an interface unit and a detachable recording medium. In addition, the recording medium includes a non-volatile memory such as a flash memory, a magnetic tape, a magnetic disk and a magnetic optical disk.

In addition, the image processing unit 6 receives display data such as a display character or a display design to be used in the human machine interface, from the control unit 4 and displays it on the display 8.

Firstly, a function in the "teaching mode" will be described.

The image processing unit 6 receives the model image from the imaging unit 2 and acquires a hue with respect to each of pixels arranged in two-dimensionally and constituting the model image. In addition, since a video signal to be outputted from the imaging unit 2 comprising the CCD or CMOS sensor, to the image processing unit 6, and a video signal to be inputted from the image processing unit 6 to the display 8 comprising the liquid crystal display are signals defined by a RGB value, the image processing unit 6 switches between a color parameter of RGB and a color parameter of hue, value and chroma. Hereinafter, the hue, value and chroma are referred to as three attributes of color, and the color parameters of the hue, value and chroma are referred to as the color parameters of three attributes, occasionally.

For example, the image processing unit 6 comprises an LSI such as a FPGA (Field Programmable Gate Array). Thus, the image processing unit 6 comprises a memory unit 6a that stores at least the color parameter of the pixel for one frame, a set value required for the image processing and work data. In addition, since high-speed data access is required for the memory unit 6a, the memory unit 6a comprises a SRAM (Static Random Access Memory).

Then, the image processing unit 6 calculates the distribution of hues with respect to the pixels that constitute the model image, that is, a hue histogram and outputs it to the control unit 4. In addition, when the control unit 4 receives a region setting command for setting a region through the input unit 12, it applies the region setting command to the image processing unit 6. Then, the image processing unit 6 calculates hues only for the pixels included in the region corresponding to the region setting command, in the model image received from the imaging unit 2. Therefore, the image processing unit 6 calculates the hue histogram only for the pixels contained in the region corresponding to the region setting command.

The control unit 4 extracts a plurality of candidate colors (up to eight candidate colors, for example) to be nominated for the registration colors from the pixel colors (color parameters) constituting the model image, based on the hue histogram received from the image processing unit 6. More specifically, the candidate color is extracted based on the hue at the maximum point in the hue histogram. At the same time, the control unit 4 determines a hue threshold value in order to specify a color range regarded as the candidate color.

In addition, the hue specifies "color shade" that is high in visual discrimination, and the difference generated by a change in hue is greater than that generated by a change in value or chroma in view of the visual discrimination. That is, when the hue is the same, even if the value and chroma are different, it is determined to be the same or similar color visually in many cases. Therefore, the control unit 4 may regard all colors whose values of hue are within the range of the hue threshold value as the candidate colors. Furthermore, the control unit 4 determines a value threshold value and a chroma threshold value for each candidate color, based on the value and chroma of the pixel having the hue that satisfies the hue threshold value of each candidate color among pixels constituting the model image in order to improve the precision for specifying the region. More specifically, the control unit 4 extracts all pixels that satisfy the hue threshold value of each candidate color, acquires the value and chroma for each of the extracted pixels, and calculates the maximum values and minimum values in the acquired value and chroma. Then, the control unit 4 sets the calculated maximum value and minimum value of the value to a value threshold value and sets the calculated maximum value and minimum value of the chroma to a chroma threshold value.

Furthermore, the control unit 4 outputs the determined hue threshold value, value threshold value and chroma threshold value to the image processing unit 6. Then, the image processing unit 6 stores the hue threshold value, value threshold value and chroma threshold value, which is received from the control unit 4, in the memory unit 6a.

In addition, the control unit 4 outputs the extracted registration color to the display 8. Then, when the control unit 4 receives a selecting command for selecting the candidate color and then a command for displaying the histogram through the input unit 12, it displays the hue histogram and hue threshold value corresponding to the selected candidate color on the display 8.

In addition, when the control unit 4 receives a command for changing the hue threshold value for any one of candidate colors through the input unit 12, it outputs a changed hue threshold value to the image processing unit 6. Then, the image processing unit 6 updates the hue threshold value of the candidate color stored in the memory unit 6a to the changed hue threshold value received from the control unit 4. Similarly, when the control unit 4 receives a command for changing the value threshold value or the chroma threshold value for any one of candidate colors through the input unit 12, it outputs a changed value threshold value or chroma threshold value to the image processing unit 6. Then, the image processing unit 6 updates the value threshold value or chroma threshold value of the candidate color stored in the memory unit 6a to the changed value or chroma threshold value received from the control unit 4.

The function in the "detecting mode" will be described hereinafter.

When the control unit 4 receives the selecting command for selecting the candidate color as the registration color through the input unit 12, it outputs the selecting command to the image processing unit 6. Then, the image processing unit 6 activates the hue threshold value, the value threshold value and the chroma threshold value corresponding to the selected candidate color among the hue threshold values, the value threshold values and the chroma threshold values of the candidate colors stored in the memory unit 6a. Then, the image processing unit 6 receives a video signal from the imaging unit 2, calculates the color parameter of three attributes for each of the pixels constituting the acquired image and specifies the pixel that satisfies all of the hue threshold value, value threshold value and chroma threshold value by which the color parameter of three attributes is activated. Furthermore, the image processing unit 6 stores the specified pixel position in the memory unit 6a and outputs only the pixel corresponding to the pixel position stored in the memory unit 6a to the display 8 among the pixels constituting the image acquired from the imaging unit 2. In addition, the pixel position is stored as a value of "1" or "0" designating the specified region or the region other than that, in a memory space corresponding to two-dimensional coordinates of the pixels that constitute the image. That is, the pixel position is equivalent to a binarized image provided by binarizing the specified region and the region other than that. In addition, the image processing unit 6 receives a display changing command applied from the control unit 4 through the input unit 12 and outputs the pixel position stored in the memory unit 6a to the display 8 as it is.

According to this embodiment of the present invention, the control unit 4 implements a "candidate color extracting device", a "hue threshold value determining device" and a "value threshold value determining device", and the image processing unit 6 implements a "hue acquiring device", a "hue histogram calculating device", and a "region specifying device", and the control unit 4 and the display 8 implements a "displaying device".

(Candidate Color Extracting Process)

As described above, many signals outputted from the imaging unit 2 and outputted to the display 8 are video signals specified by the RGB values. This is because the shooting and displaying can be easily implemented by arranging light receiving elements responding to the R (Red), G (Green) and B (Blue) or light emitting elements emitting R (Red), G (Green) and B (Blue) evenly based on the three primary colors of light.

Meanwhile, the image processing apparatus 1 according to the embodiment of the present invention performs an image processing based on the hue mainly. Therefore, the image processing unit 6 switches between the color parameter for RGB and the color parameter for three attributes. In addition, both color parameter for RGB and color parameter for three attributes are methods for quantifying the color, and they are switched based on a predetermined conversion equation.

In addition, although there are several coordinate systems for describing the color parameter for three attributes such as L*a*b*color system defined by JIS (Z8729), L*c*h*color system, Hunter Lab color system, XYZ color system and the like, any color system may be used. In addition, the conversion equation with the color parameter of RGB varies depending on each color system.

As described above, the image processing unit 6 acquires the hue with respect to each of pixels constituting the model image received from the imaging unit 2 and calculates the hue histogram. Then, the processing unit 6 outputs the calculated hue histogram to the control unit 4 and the control unit 4 extracts the candidate color based on the hue histogram outputted from the image processing unit 6.

In addition, the image processing unit 6 calculates the hue histogram only from the pixels contained in the region corresponding to the region setting command among the pixels constituting the model image, in response to the region setting command inputted from the control unit 4 through the input unit 12.

Figure 3A:
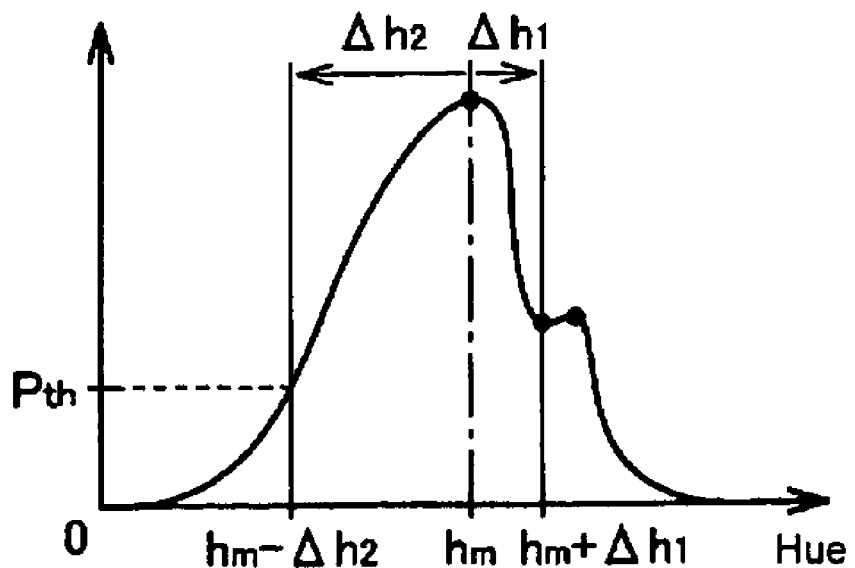
FIGS. 3A and 3B show views to explain the extraction of a candidate color based on a hue histogram by a control unit.
Figure 3B:
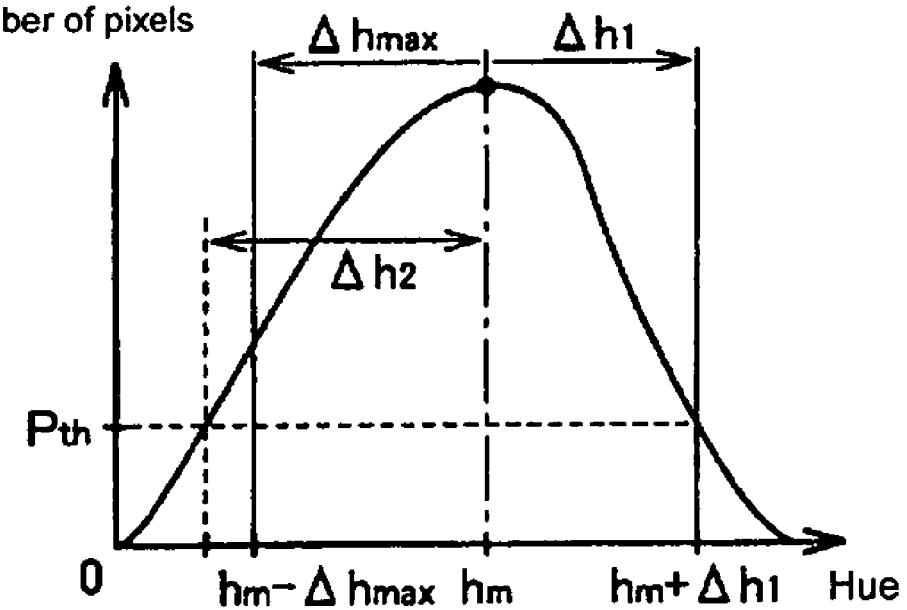

FIGS. 3A and 3B show views to explain the extraction of the candidate color by the control unit 4 based on the hue histogram.

FIG. 3A shows an example when the distance between the maximum point and the minimum point is small.

FIG. 3B shows an example when the distance between the maximum point and the minimum point is long.

At first, referring to FIG. 3A, the control unit 4 detects the maximum point and the minimum point on the hue histogram. Then, the control unit 4 acquires a hue $h_m$ at the detected maximum point and determines either a hue width between the hue $h_m$ and the adjacent minimum point or a hue width between the hue $h_m$ and the intersecting point of a pixel threshold value $P_{th}$ and the hue histogram that is smaller than the other, as the hue threshold value. In addition, since the pixel threshold value $P_{th}$ specifies minimal pixels that can be determined to be effective, among distributed pixels to prevent the influence such as a noise contained in the image.

According to the hue histogram shown in FIG. 3A, since the minimum point exists closely in the side (right side in the drawing) in which the hue is high, a hue width $\Delta h1$ between the hue $h_m$ and the minimum point is determined as the hue threshold value. In addition, since an adjacent minimum point does not exist in the side (left side in the drawing) in which the hue is low, a hue width $\Delta h2$ between the hue $h_m$ and the intersecting point between the pixels threshold value $P_{th}$ and the hue histogram is determined as the hue threshold value. Therefore, the candidate colors defined by the hue $h_m$ includes colors having the hues within a range of a hue ($h_m - \Delta h2$) to a hue ($h_m + \Delta h1$).

Furthermore, when the hue threshold value becomes too high, since the precision for specifying the region is lowered, the maximum of the hue threshold value (maximum threshold value width $\Delta h_{max}$) may be set.

According to the hue histogram shown in FIG. 3B, since an adjacent minimum point does not exist in the side (right side in the drawing) in which the hue is high, a hue width $\Delta h1$ between the hue $h_m$ and the intersecting point between the pixel threshold value $P_{th}$ and the hue histogram is determined as the hue threshold value. Similarly, since an adjacent minimum point does not exist in the side (left side in the drawing) in which the hue is low, a hue width $\Delta h2$ between the hue $h_m$ and the intersecting point between the pixel threshold value $P_{th}$ and the hue histogram is detected. However, since the maximum threshold value width $\Delta h_{max}$<the hue width $\Delta h2$, the maximum threshold value width $\Delta h_{max}$ is determined as the hue threshold value. Therefore, the candidate colors defined by the hue $h_m$ includes colors having the hue within a range of a hue ($h_m - \Delta h_{max}$) to a hue ($h_m + \Delta h1$).

Then, when there are plurality of maximum points in the hue histogram and a plurality of candidate colors can be extracted, the control unit 4 extracts the candidate color that is highly likely to be determined as the registration color, that is, the candidate color having greater portion in the image on a priority basis. Therefore, the control unit 4 calculates a distribution frequency area (total number of the pixels) within the range of the hue threshold value with respect of each of the candidate colors determined through the steps similar to the above, and sequentially extracts the color having the large distribution frequency area in decreasing order as the candidate color.

In addition, instead of the decreasing order of the distribution frequency area, the candidate color may be extracted in the decreasing order of the number of pixels (peak value) of the hue that defines each candidate color.

As described above, when the candidate color is ranked based on the distribution frequency area and the like, in the case where many candidate colors cannot be stored because of constraint of memory capacity and the like, the candidate color that will be highly determined as the registration color can be effectively extracted.

Furthermore, since the control unit 4 determines the value threshold value and the chroma threshold value in order to define the color contained in the candidate color. Thus, the control unit 4 extracts the pixel having the hue within the range of the hue threshold value with respect to each candidate color among the pixels constituting the model image. Then, the control unit 4 acquires the maximum value and the minimum value from the value and chroma of the pixel contained in each extracted candidate color. That is, among the pixels constituting the model image, the control unit 4 limits an allowable range of the value and chroma based on the distribution of the value and the chroma of the pixel contained in the candidate color.

As described above, when the control unit 4 determines the hue threshold value, the value threshold value and the chroma threshold value that define each candidate color, it outputs these values to the image processing unit 6 so that these values are stored in the memory unit 6a.

Figure 4:
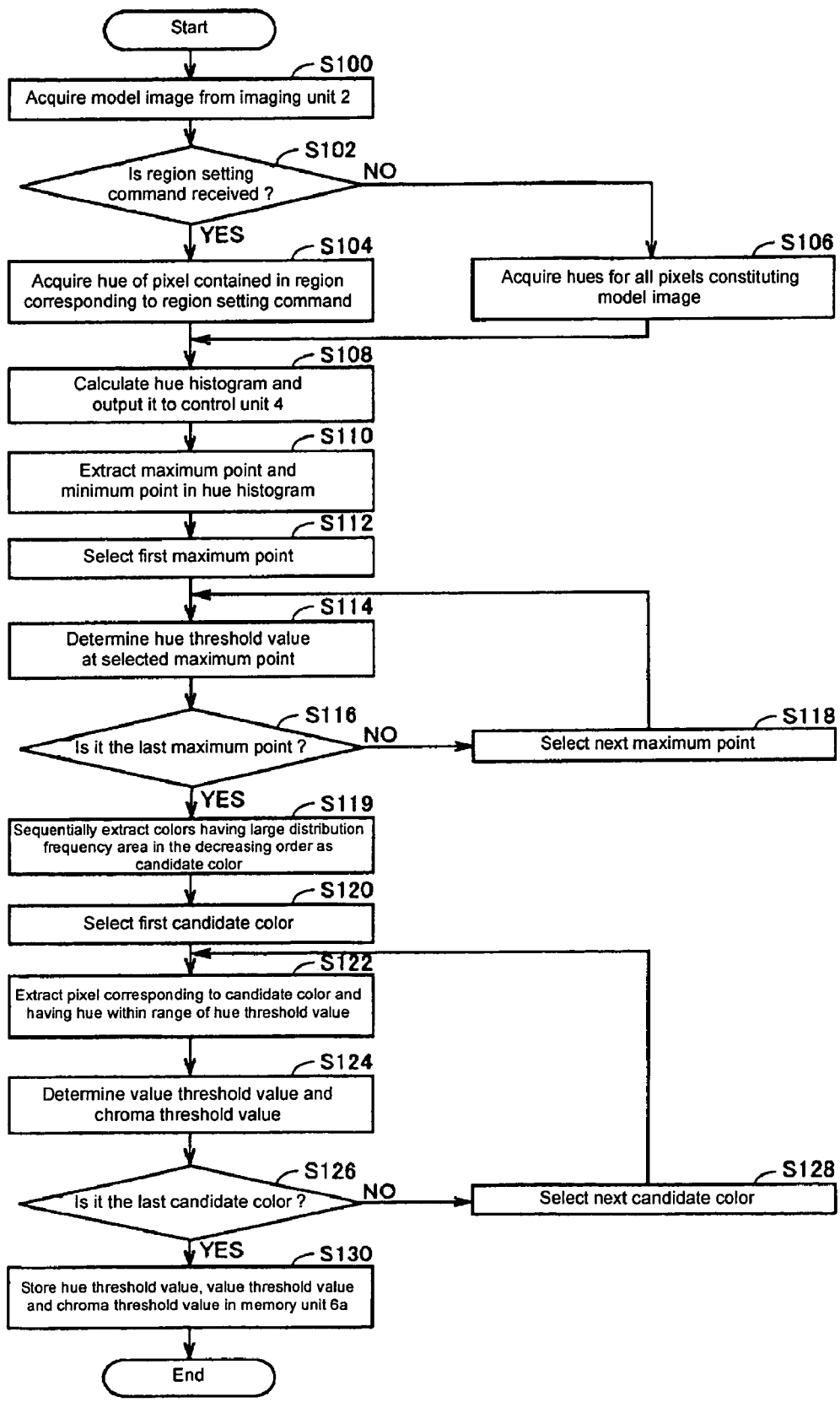
FIG. 4 shows a flowchart regarding the extraction of the candidate color.

FIG. 4 shows a flowchart regarding the candidate color extraction.

Referring to FIG. 4, the image processing unit 6 acquires the model image from the imaging unit 2 (step S100). Then, the image processing unit 6 determines whether it receives the region setting command inputted from the control unit 4 through the input unit 12 or not (step S102). When it receives the region setting command (YES at step S102), the image processing unit 6 acquires the hues of the pixels contained in the region corresponding to the region setting command among pixels constituting the model image (step S104). When it does not receive the region setting command (NO at step S102), the image processing unit 6 acquires the hues of all pixels constituting the model image (step S106).

Then, the image processing unit 6 calculates the hue histogram from the acquired hues of the pixels and outputs it to the control unit 4 (step S108).

The control unit 4 extracts the maximum point and the minimum point in the hue histogram received from the image processing unit 6 (step S110). Then, the control unit 4 selects the first maximum point among maximum points in the extracted hue histogram (step S112). Then, the control unit 4 determines the hue threshold value of the selected maximum point according to the above-described procedures (step S114). In addition, the first maximum point means the maximum point arranged first among the maximum points arranged according to any rule of hue order or a maximum value.

Then, the control unit 4 determines whether the selected maximum point is the last maximum point among the extracted maximum points or not (step S116). When it is not the last maximum point (NO at step S116), the control unit 4 selects the next maximum point (step S118) and repeats the operations at steps S114 and 116.

When it is the last maximum point (YES at S116), the control unit 4 calculates the distribution frequency area in the range of the respective hue threshold value in the hue histogram and sequentially extracts the candidate color having the large distribution frequency area in the decreasing order (step S119).

Then, the control unit 4 selects the first candidate color among the extracted candidate colors (step S120), and extracts the pixel having the hue in the range of the hue threshold value corresponding to the selected candidate color (step S122). Then, the control unit 4 acquires the maximum values and the minimum values from the value and chroma of the extracted pixel, and determines the value threshold value and the chroma threshold value (step S124).

Then, the control unit 4 determines whether the selected candidate color is the last candidate color among the extracted candidate colors or not (step S126). When it is not the last candidate color (NO at step S126), the control unit 4 selects the next candidate color (step S128) and repeats the operations at steps S122, S124, and S126.

When it is the last candidate color (YES at step S126), the control unit 4 stores the hue threshold value, the value threshold value and chroma threshold value of the determined candidate color in the memory unit 6a (step S130). Then, the control unit 4 completes the operations.

(Human Machine Interface)

Figure 5:
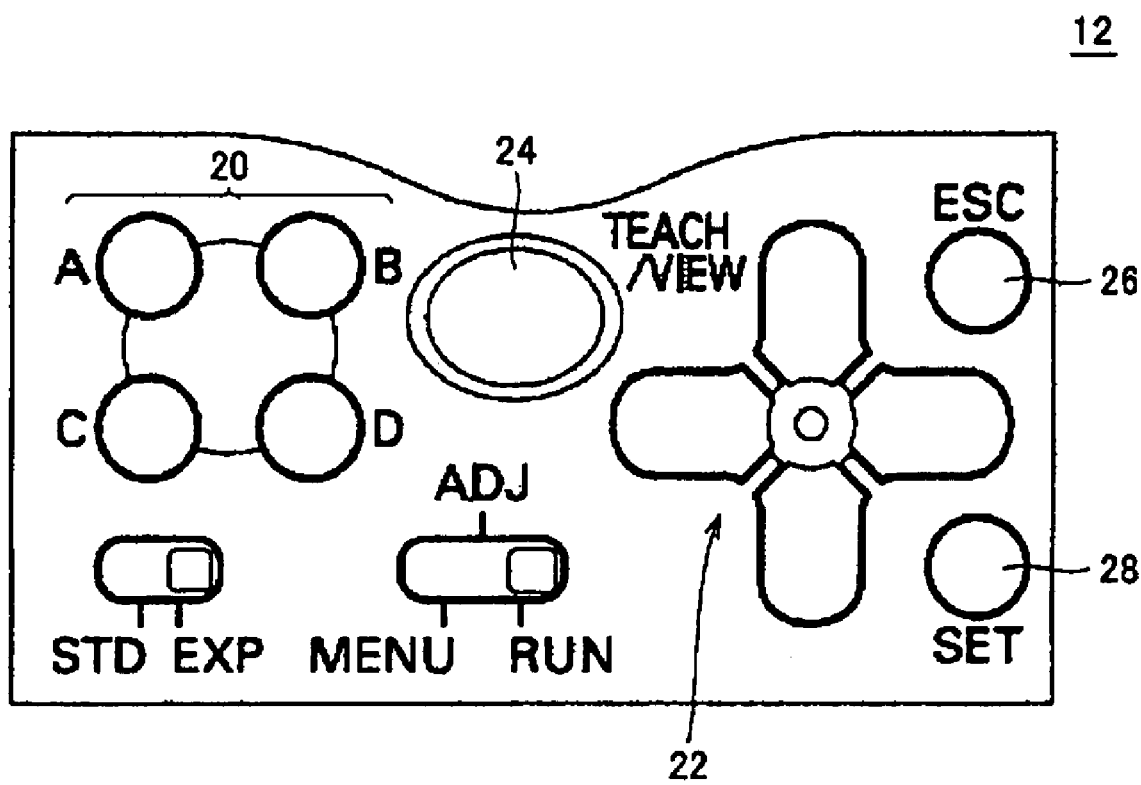
FIG. 5 shows an external view of an input unit in the image processing apparatus according to the embodiment of the present invention.

FIG. 5 shows an external view of the input unit 12 in the image processing apparatus 1 according to the embodiment of the present invention.

Referring to FIG. 5, the input unit 12 includes selection keys 20 for receiving four kinds of inputs "A", "B", "C" and "D", arrow keys 22 for receiving commands in four directions "upward", "downward", "rightward" and "leftward", a TEACH/VIEW key 24, an ESC key 26, and a SET key 28. The user operates the input unit 12 to send each command to the control unit 4 according to the display contents on the display 8.

Figure 6:
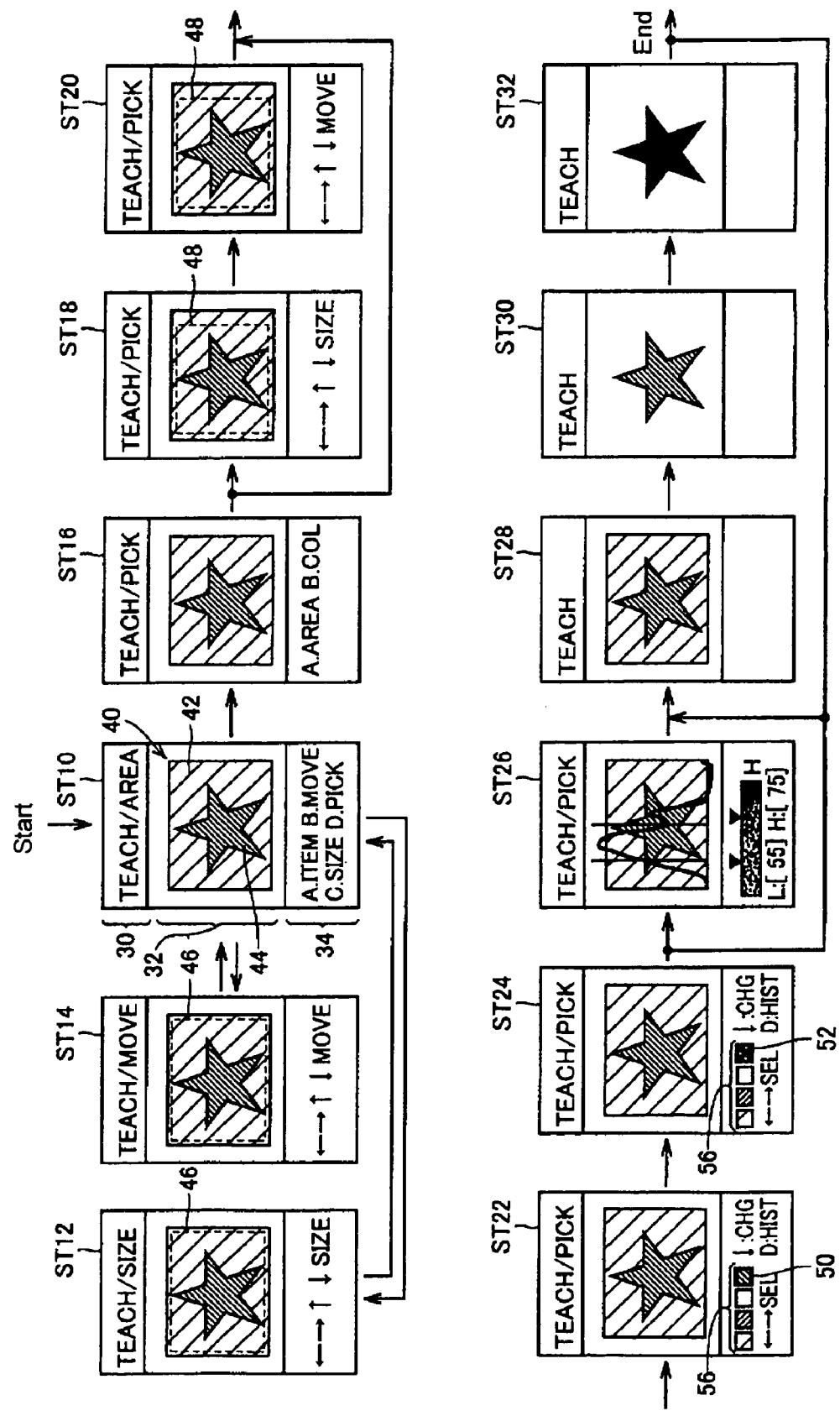
FIG. 6 shows a view of an example of a display mode in a teaching mode in the image processing apparatus according to the embodiment of the present invention.

FIG. 6 shows one example of the display in the teaching mode in the image processing apparatus 1 according to the embodiment of the present invention.

Referring to FIG. 6, the display 8 includes a state display area 30 for displaying the operation state of the image processing apparatus 1 and the like, an image display area 32 for displaying the image taken by the imaging unit 2 or the image after the process by the image processing unit 6 and the like, and an operation contents display area 34 for displaying the operation contents of the user.

When the teaching mode is selected, the image processing unit 6 receives a video signal from the imaging unit 2 and displays a model image 40 taken by the imaging unit 2 in the image display area 32 (display mode ST10). For example, the model image 40 is the image of an object in which a star mark 44 having a color different from that of a base 42 is arranged on the rectangular base 42. In addition, the image processing unit 6 receives display data from the control unit 4 and displays the state in which the detection region setting is being received in the detecting mode in the state display area 30 and displays the command that can be inputted and the selection keys 20 so as to relate them to each other in the operation contents display area 34.

Here, when the user presses the "B" key in the selection keys 20 shown in FIG. 5, the image processing unit 6 displays a search region 46 added on the model image on the image display area 32 and receives a size change of the search region 46 (display mode ST12). The search region 46 is a searching range set in the image acquired in the detecting mode. In addition, the image processing unit 6 displays the state in which the size change of the search region 46 is being received in the state display area 30 and displays the command that can be inputted and the arrow keys 22 so as to relate them to each other in the operation contents display area 34. Here, the user operates the arrow keys 22 shown in FIG. 5 to set the desired size of the search region 46.

When the user presses the ESC key 26 in the display mode ST12, the image processing unit 6 moves the display to the previous display mode ST10. Similarly, the image processing unit 6 moves the display to the display previous to that currently displayed in response to the press of the ESC key 26.

Meanwhile, when the user presses the "C" key of the selection keys 20 in the display mode ST10, the image processing unit 6 displays the search region 46 added on the model image in the image display area 32 and receives the movement of the search region 46 (display mode ST14). In addition, the image processing unit 6 displays the state in which the movement of the search region 46 is being received in the state display area 30 and displays the command that can be inputted and the arrow keys 22 so as to relate them to each other in the operation contents display area 34. Here the user operates the arrow keys 22 shown in FIG. 5 to set the desired position of the search region 46.

In addition, when the user presses the "A" key of the selection keys 20 in the display mode ST10, the image processing unit 6 displays a general menu display (not shown) for various kinds of settings.

When the user presses the "D" key of the selection keys 20 in the display mode ST10, the image processing unit 6 displays a menu screen in which the operation regarding the extraction of the candidate color is received (display mode ST16).

Here, when the user presses the "A" key of the selection keys 20, the image processing unit 6 displays a model region 48 added on the model image in the image display area 32 and receives the size change of the model region 48 (display mode ST18). The model region 48 is a region set to extract the candidate color from the model image. In addition, the image processing unit 6 displays the state in which the size change of the model region 48 is being received in the state display area 30 and displays the command that can be inputted and the arrow keys 22 so as to relate them to each other in the operation contents display area 34.

Then, the user operates the arrow keys 22 and sets the desired size of the model region 48. When the setting of the size of the model region 48 is completed, the user presses the SET key 28.

Then, the image processing unit 6 receives the movement of the model region 48 while keeps to display the model region 48 (display mode ST20). In addition, the image processing unit 6 displays the state in which the movement of the model region 48 is being received in the state display area 30 and displays the command that can be inputted and the arrow keys 22 so as to relate them to each other.

Then, the user operates the arrow keys 22 and sets the desired position of the model region 48. When the position setting of the model region 48 is completed, the user presses the SET key 28.

In addition, in the display modes ST18 and ST20, the image processing unit 6 displays the model region 48 in which the size smaller than the image display area 32 is set as its initial size setting (default size setting) and the center of the image display area 32 is set as its initial position setting (default position setting), for the model region 48 is smaller than the image display area 32 because the object to be detected is shot so as to fall in the shooting range of the imaging unit 2 in general. Therefore, since the model region 48 is smaller than the image display area 32, the setting operation by the user can be simplified.

When the user presses the SET key 28 in the display mode ST20, the control unit 4 and the image processing unit 6 performs the above-described processes to extract the candidate color. Then, the image processing unit 6 displays an extracted candidate color 56 in the operation contents display area 34 (display mode ST22). In addition, the image processing unit 6 displays the command for selecting the displayed candidate color and the command for displaying the histogram, and the selection keys 20 and the arrow keys 22 so as to relate them to each other in the operation contents display area 34.

Here, the user operates the "rightward" key and the "leftward" key of the arrow keys 22 to move a selection frame 50 displayed in the operation contents display area 34 to the desired position of the candidate color 56, and presses the "downward" key of the arrow keys 22 to select the candidate color as the registration color. Then, the image processing unit 6 displays a registration frame 52 added on the candidate color 56 selected as the registration color (display mode ST24).

Then, when the user presses the "D" key of the selection keys 20, the image processing unit 6 displays the hue histogram of the candidate color selected as the registration color added on the model image in the image display area 32, and receives the change in hue threshold value (display mode ST26). In addition, the image processing unit 6 displays a boundary of the hue threshold value in addition to the waveform of the hue histogram. In addition, the image processing unit 6 displays the chart showing the hue and the numeric value of the hue threshold value in the operation contents display area 34.

Here, when the user changes the hue threshold value of the selected candidate color, the user operates the arrow keys 22 to change the hue threshold value. In response to the change of the hue threshold value, the image processing unit 6 changes the boundary of the hue histogram displayed in the image display area 32 and the numeric value of the hue threshold value displayed in the operation contents display area 34. Thus, when the hue threshold value is changed, the user presses the SET key 28. Then, the image processing unit 6 updates the hue threshold value stored in the memory unit 6*a* to the hue threshold value changed by the user.

In addition, in display mode ST26, in response to the press of the TEACH/VIEW key 24 by the user, the image processing unit 6 may cyclically change the numeric value of the threshold value displayed in the operation contents display area 34 to the hue threshold value, the value threshold value and the chroma threshold value in this order. Thus, it may be constituted that when the user changes any one of the hue threshold value, the value threshold value and the chroma threshold value displayed in the operation contents display area 34 to the desired numeric value, the image processing unit 6 updates the hue threshold value, the value threshold value and the chroma threshold value stored in the memory unit 6*a* to the threshold value changed by the user.

Then, the image processing unit 6 displays a region specified result of the registration color obtained by the teaching (display modes ST28, ST30 and ST32).

In the display mode ST28, the image processing unit 6 displays the model image obtained from the imaging unit 2 as it is. Thus, when the user presses the TEACH/VIEW key 24, the image processing unit 6 extracts the region having the registration color from the model image and displays it (display mode ST30). In addition, the display mode ST30 shows the example in which the candidate color extracted from the mark 44 is selected as the registration color.

When the user presses the TEACH/VIEW key 24 again, the image processing unit 6 extracts only the region having the registration color from the model image and displays the extracted region as the binarized image (display mode ST32).

When the user presses the SET key 28 in the display modes ST28 to ST32, the teaching process is completed.

The image processing apparatus 1 according to this embodiment of the present invention carries out the teaching process by the above-described human machine interface.

Figure 7:
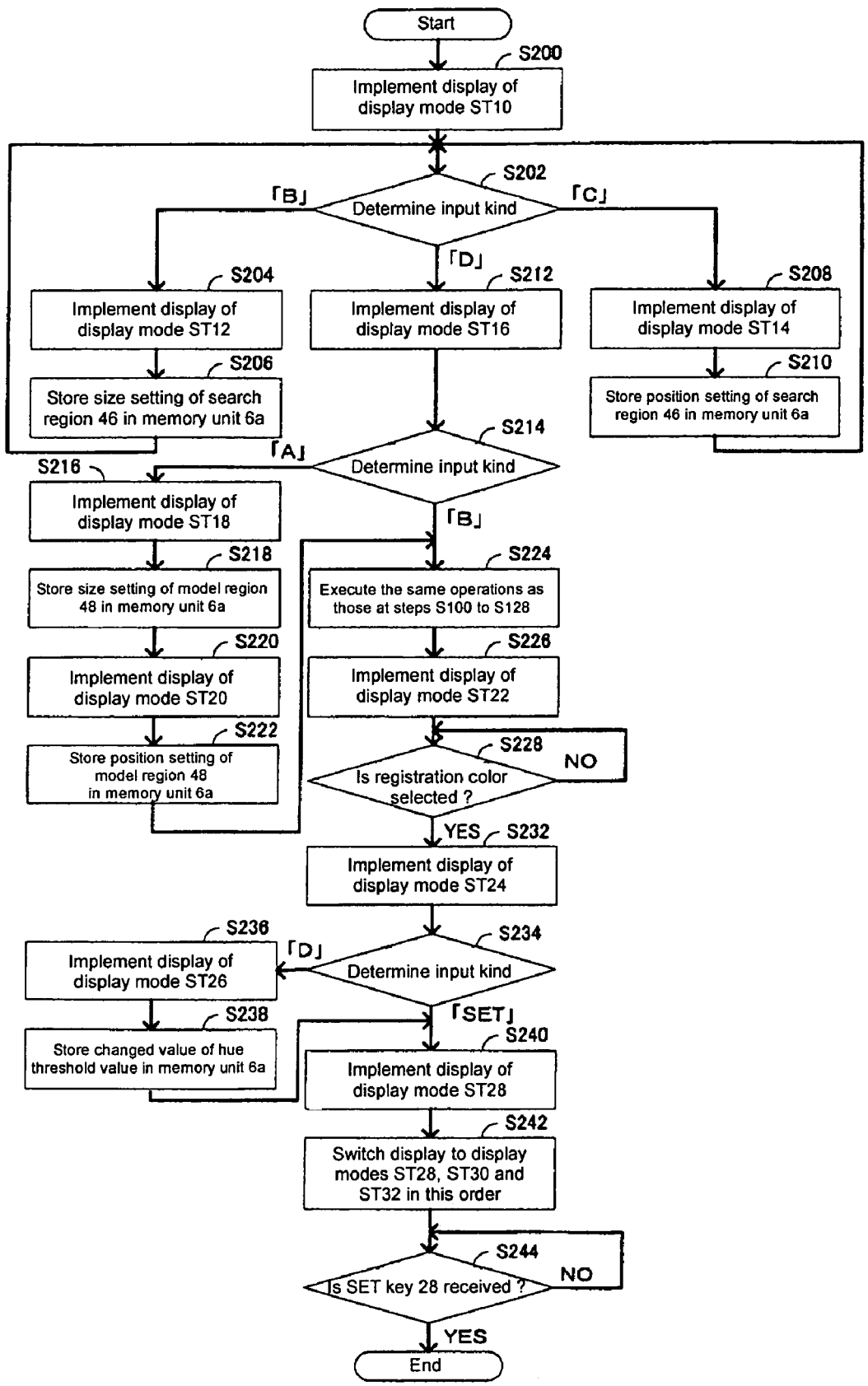
FIG. 7 shows a flowchart to implement a human machine interface according to a teaching process.

FIG. 7 shows a flowchart to implement the human machine interface regarding to the teaching process.

Referring to FIG. 7, the control unit 4 makes the image processing unit 6 display the display mode ST10 (step S200). Then, when the control unit 4 receives the input of the selection keys 20 from the user, it determines the kind of the input (step S202).

When the control unit 4 receives the "B" key of the selection keys 20 (the input is "B" at step S202), it makes the image processing unit 6 display the display mode ST12 (step S204). Then, the control unit 4 receives the size setting of the search region 46 through the input of the arrow keys 22 from the user and stores the size setting of the search region 46 in the memory unit 6a of the image processing unit 6 (step S206). Then, the control unit 4 waits for the input of the selection keys 20 from the user again (step S202).

When the control unit 4 receives the "C" key of the selection keys 20 (the input is "C" at step S202), it makes the image processing unit 6 display the display mode ST14 (step S208). Then, the control unit 4 receives the position setting of the search region 46 through the input of the arrow keys 22 from the user and stores the position setting of the search region 46 in the memory unit 6a of the image processing unit 6 (step S210). Then, the control unit 4 waits for the input of the selection keys 20 from the user again (step S202).

When the control unit 4 receives the "D" key of the selection keys 20 (the input is "D" at step S202), it makes the image processing unit 6 display the display mode ST16 (step S212). Then, when the control unit 4 receives the input of the selection keys 20 from the user, it determines the kind of the input (step S214). When it receives the input other than the "A" key or the "B" key of the selection keys 20, the control unit 4 waits for the input of the "A" key or the "B" key of the selection keys 20.

When the control unit 4 receives the "A" key of the selection keys 20 (the input is "A" at step S214), it makes the image processing unit 6 display the display mode ST18 (step S216). Then, the control unit 4 receives the size setting of the model region 48 through the input of the arrow keys 22 from the user and stores the size setting of the model region 48 in the memory unit 6a of the image processing unit 6 (step S218). Then, the control unit 4 makes the image processing unit 6 display the display mode ST20 (step S220). Then, the control unit 4 receives the position setting of the model region 48 through the input of the arrow keys 22 from the user and stores the position setting of the model region 48 in the memory unit 6a of the image processing unit 6 (step S222).

When the control unit 4 receives the "B" key of the selection keys 20 (the input is "B" at step S214), or after the operation at the step S222 have been carried out, the control unit 4 and the image processing unit 6 carry out the same operations at the steps S100 to S128 (step S224). Furthermore, the control unit 4 makes the image processing unit 6 display the display mode ST22 based on the candidate color extracted at step S224 (step S226).

Then, the control unit 4 determined whether it receives the selection of the registration color from the user or not (step S228). When it does not receive the selection of the registration color (NO at step S228), the control unit 4 waists for the selection of the registration color (step S228).

When it receives the selection of the registration color (YES at step S228), the control unit 4 makes the image processing unit 6 display the display mode ST24 (step S232). Thus, when the control unit 4 receives the input from the user through the input unit 12, it determines the kind of the input (step S234). When it receives the input other than the "D" key of the selection keys 20 or the SET key 28, the control unit 4 waits for the input of the "D" key of the selection keys 20 or the SET key 28.

When the control unit 4 receives the "D" key of the selection keys 20 (the input is "D" at step S234), the control unit 4 makes the image processing unit 6 display the display mode ST26 (step S236). Then, the control unit 4 receives the changed value of the hue threshold value through the input of the arrow keys 22 form the user and stores the changed value of the hue threshold value in the memory unit 6a of the image processing unit 6 (step S238).

When the control unit 4 receives the SET key 28 (the input is "SET" at step S234), or after the operation at the step S238 has been carried out, the control unit 4 makes the image processing unit 6 display the display mode ST28 (step S240). Then, when the control unit 4 receives the TEACH/VIEW key 24 from the user, it makes the image processing unit 6 switching the display to the display modes ST28, ST30 and ST32 in this order (step S242). Then, the control unit 4 determines whether it receives the SET key 28 or not (step S244). When it does not receive the SET key 28 (NO at step S244), the control unit 4 repeats the step S242.

When it receives the SET key 28 (YES at step S244), the control unit 4 completes the process.

(Region Specifying Function)

Figure 8A:
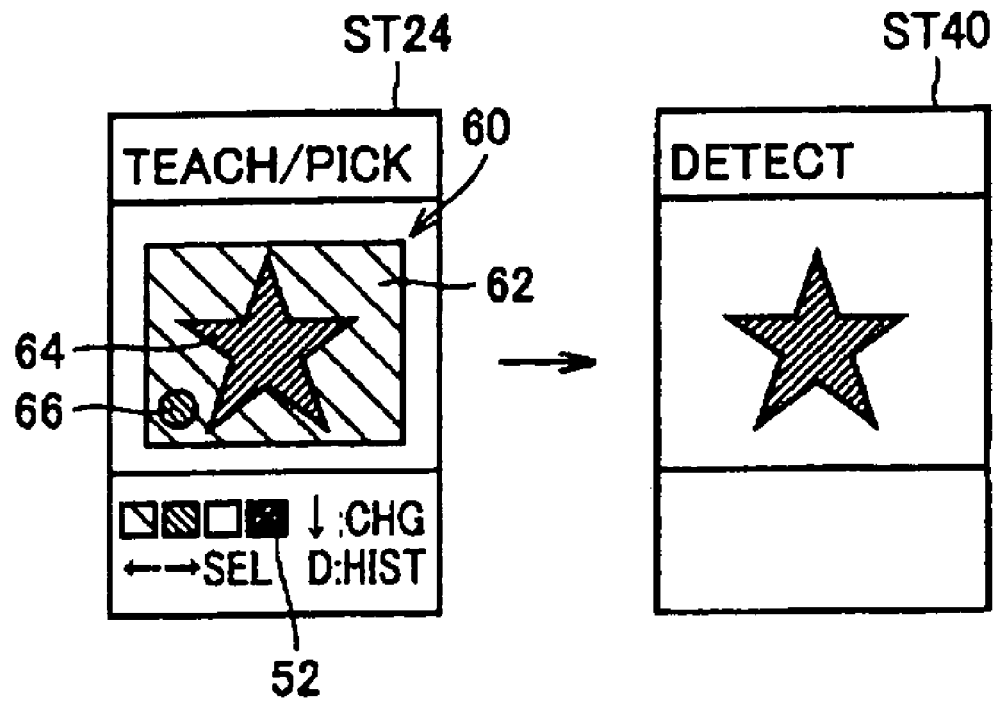
FIGS. 8A and 8B show views of an example of a display mode in the teaching mode and a detecting mode in the image processing apparatus according to the embodiment of the present invention.
Figure 8B:
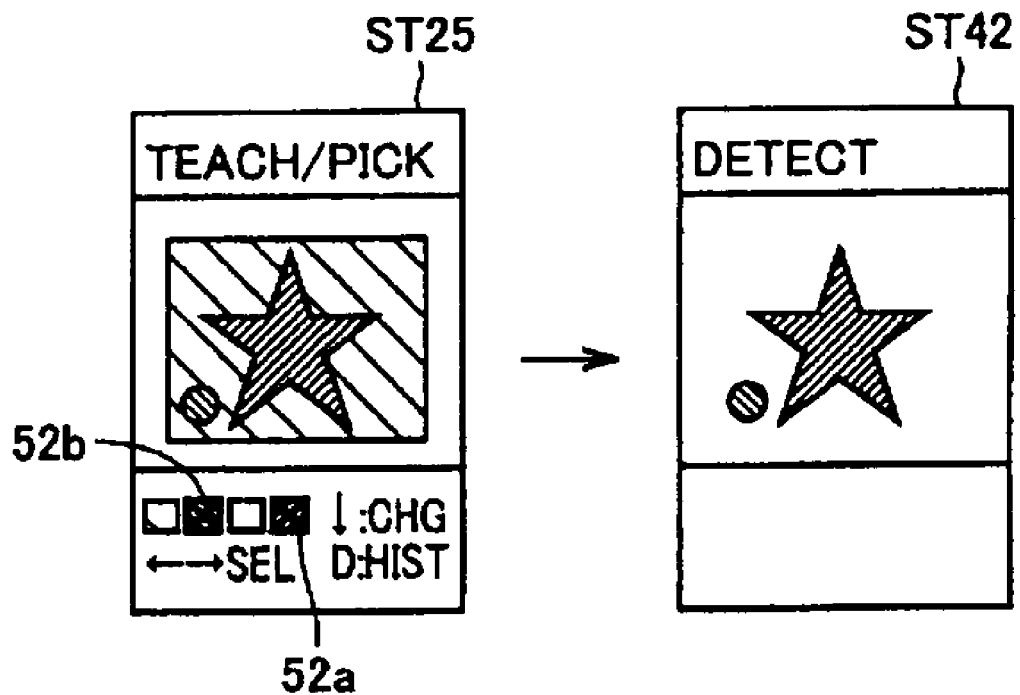

FIGS. 8A and 8B show one example of the display mode in the teaching mode and the detecting mode in the image processing apparatus 1 according to the embodiment of the present invention.

FIG. 8A shows a case where one candidate color is selected as the registration color.

FIG. 8B shows a case where the plurality of candidate colors are selected as the registration colors.

Referring to FIG. 8A, a model image 60 is an image of an object in which a star mark 64 and a circle mark 66 are arranged on a rectangular base 62. In addition, the colors of the base 62 and the marks 64 and 66 are different from each other.

As described above, when the teaching process is executed, the image processing unit 6 extracts the colors of the base 62 and the marks 64 and 66 as the candidate colors and displays them as shown in display mode ST24. Here, when the user selects only the candidate color extracted from the mark 64 as the registration color using a registration frame 52, the image processing unit 6 specifies the region of the mark 64 and displays it in the detecting mode (display mode ST40).

However, since the plurality of regions to be detected are contained in the same inputted image in many cases, it is desirable that the plurality of candidate colors can be selected as the registration colors.

Thus, the image processing unit 6 allows the plurality of candidate colors to be selected as the registration colors as shown in FIG. 8B. For example, the user selects the colors of the marks 64 and 66 as the registration colors, using the plurality of registration frames 52a and 52b (display mode ST25). Thus, the image processing unit 6 specifies the region of the mark 64 and the region of the mark 66 and displays them superimposed on the same display 8 in the detecting mode (display mode ST42).

Thus, the plurality of regions having the different colors to be specified can be comprehensively specified in the inputted image.

In order to implement such region specifying function, the image processing unit 6 calculates a color parameter of three attributes of each pixel constituting the inputted image with respective to each candidate color selected as the registration color and specifies the pixel that satisfies all of the hue threshold value, the value threshold value and chroma threshold value that enable the color parameter of three attributes. Then, the image processing unit 6 stores the pixel position specified for each candidate color in the memory unit 6a. After the pixel positions for all candidate colors have been specified, the image processing unit 6 reads out the pixel position for each candidate color from the memory unit 6a and calculates an OR pixel position by the logical OR operation. Furthermore, the image processing unit 6 outputs only the pixel that corresponds to the OR pixel position to the display 8 among the pixels constituting the image acquired from the imaging unit 2.

As described above, when the image processing unit 6 performs the logical OR operation of the pixel position for each candidate color selected as the registration color, the region having the plurality of registration colors can be specified.

According to the embodiment of the present invention, the image processing unit acquires the hue that defines the "color shade" that is highly identified visually with respect to the pixel constituting the model image, and calculates the hue histogram from the acquired hue. Then, the candidate color is extracted based on the hue at the maximum point in the calculated hue histogram. Therefore, the color having high content ratio can be extracted from the colors contained in the model image as the candidate color. Thus, the image processing apparatus can extract the suitable candidate color as a whole of the model image and determine the optimal registration color according to the acquired image.

In addition, according to the embodiment of the present invention, since the hue is acquired with respect to the all pixels contained in the color extraction region set by the user in the model image, it is not necessary for the user to set the position in the model image to be the candidate color. Thus, since the operation of the user regarding the extraction of the candidate color can be simplified, the user-friendly image processing apparatus can be implemented.

In addition, according to the embodiment of the present invention, the user can change the hue threshold value, the value threshold value and chroma threshold value that define the color contained in the candidate color to desired values. Therefore, since the user can easily change the detection range, the optimal detection condition can be set according to the object to be detected.

It is to be noted that the embodiments disclosed in this specification is illustrative but not limitative. It is intended that the scope of the present invention is not limited by the above description but limited by the terms of appended claims, and various kinds of modifications and variations may be included within the same or equal scope of the claims.

What is claimed is:

1. An image processing apparatus that specifies a region having a registration color that is registered from a color contained in a predetermined color range in an acquired image, comprising:
    a hue acquiring device that receives a model image to set the registration color and acquires a hue with respect to each of pixels constituting the model image;
    a hue histogram calculating device that calculates a hue histogram with respect to the pixels constituting the model image, based on the hue acquired by the hue acquiring device; and
    a candidate color extracting device that extracts a candidate color in the predetermined color range nominated for the registration color, among the colors contained in the model image, based on the hue histogram calculated by the hue histogram calculating device,
    wherein the candidate color extracting device includes a hue threshold value determining device that determines a hue threshold value to define a predetermined range with respect to each candidate color, based on the hue histogram so that each of the candidate colors contains the color within the predetermined color range,
    wherein the hue threshold value determining device determines the hue threshold value so that the hue within the predetermined range from hue at the maximum point in the hue histogram is contained in the candidate color,
    wherein image processing apparatus specifies a color range with respect to the model image received by taking an image of a target object, the color range containing a registration color and colors similar to the registration color,
    wherein the predetermined color range is a range that includes a same color as the registration color and the colors similar to the registration color,
    wherein the hue threshold value includes at least a first threshold value belonging to a higher level and a second threshold value belonging to a lower level, and
    wherein the color range is defined with the first and second threshold values.

2. The image processing apparatus according to claim 1, wherein the candidate color extracting device extracts as the candidate color the color having the hue at a maximum point in the hue histogram or the color containing the hue within a predetermined range.

3. The image processing apparatus according to claim 1, wherein when a minimum point in the histogram is contained in the predetermined range from the hue at the maximum point in the hue histogram, the hue threshold value determining device determines the hue threshold value at the minimum value as the hue threshold value.

4. The image processing apparatus according to claim 1, further comprising a display device, wherein
    the hue threshold value determining device receives a command for changing the hue threshold value from the outside and updates the hue threshold value, and
    the display device displays the hue histogram calculated by the hue histogram calculating device and the hue threshold values,
    wherein the display device simultaneously displays the hue histogram and the color range defined with the first and second threshold values, and
    wherein the first and second threshold values can be arbitrarily adjusted.

5. The image processing apparatus according to claim 4, wherein the first and second threshold values can be arbitrarily adjusted by a user.

6. The image processing apparatus according to claim 1, wherein the candidate color extracting device further includes a value and chroma threshold value determining device for determining a value threshold value and a chroma threshold value for defining the range of the color regarded as the candidate color, based on the value and chroma of the pixel that satisfies the hue threshold value determined by the hue threshold value determining device among pixels constituting the model image.

7. The image processing apparatus according to claim 6, wherein the value and chroma threshold value determining device receives a command for changing the value threshold value and/or the chroma threshold value from the outside and updates the value threshold value and/or the chroma threshold value.

8. The image processing apparatus according to claim 1, wherein the hue acquiring device receives a region setting command to set a region for extracting the candidate color in the model image from the outside, and acquires the hue with respect to the pixel contained in the region set according to the region setting command.

9. The image processing apparatus according to claim 1, further comprising a region specifying device that receives a command for selecting the candidate color to be the registration color form the outside and specifies the region having the candidate color selected by the selecting command in the acquired image and displays it.

10. The image processing apparatus according to claim 9, wherein when the plurality of candidate colors are selected by the selecting command, the region specifying device specifies a region for each of the plurality of candidate colors and displays the specified regions superposed to each other.

* * * * *